United States Patent [19]

Pawlek

[11] 3,949,051
[45] Apr. 6, 1976

[54] HYDROMETALLURGICAL PROCESS FOR EXTRACTING COPPER FROM CHALCOPYRITE OR BORNITE CONCENTRATES

[76] Inventor: Franz Pawlek, Viktoriastrasse 14, 1000 Berlin 45, Germany

[22] Filed: Jan. 7, 1974

[21] Appl. No.: 431,159

[30] Foreign Application Priority Data
Feb. 21, 1973  Austria................................ 151673

[52] U.S. Cl. ...................... 423/28; 423/27; 423/41; 423/57 BA; 241/16
[51] Int. Cl.².......................................... C01G 3/10
[58] Field of Search ............ 423/28, 41, 27; 75/117; 204/106; 241/16, 15, 20, 21

[56] References Cited
UNITED STATES PATENTS

| | | | |
|---|---|---|---|
| 2,838,391 | 6/1958 | Kaufman et al. ........................... | 75/2 |
| 3,293,093 | 12/1966 | Jones et al. .......................... | 204/106 |
| 3,309,029 | 3/1967 | Frame.................................... | 241/20 |
| 3,596,838 | 8/1971 | Weston................................. | 241/16 |
| 3,637,371 | 1/1972 | Mackiw et al. ................... | 423/41 X |
| 3,642,435 | 2/1972 | Allen et al. ........................... | 423/41 |
| 3,886,257 | 5/1975 | Snell .................................... | 423/27 |

OTHER PUBLICATIONS

Kirk Othmer, editors, "Encyclopedia of Chemical Technology," 2nd Edition, John Wiley & Sons, New York, Vol. 9, (1966), pp. 390, 393, Vol. 18, (1969), pp. 338–340.
Journal of Metals, Feb. 1971, pp. 25, 26.
Boldt, "The Winning of Nickel," D. Van Nostrand Co., Princeton, New Jersey, 1967, pp. 199–202.

*Primary Examiner*—Herbert T. Carter
*Assistant Examiner*—Brian E. Hearn
*Attorney, Agent, or Firm*—Hamilton, Renner & Kenner

[57] ABSTRACT

A process for extracting copper from a copper-containing concentrate by comminuting the concentrate in the presence of a liquid dispersing agent which inhibits agglomeration and forms a pulp, and leaching the pulp in the presence of a silver catalyst.

5 Claims, No Drawings

HYDROMETALLURGICAL PROCESS FOR EXTRACTING COPPER FROM CHALCOPYRITE OR BORNITE CONCENTRATES

BACKGROUND OF THE INVENTION

Chalcopyrite ($CuFeS_2$) is the most common ore of copper. A substantial part of world copper production is derived from this mineral, solely by pyrometallurgical treatment subsequent to flotation enrichment of the mineral. Recovery of the copper is effected in the following steps: roasting, matte smelting and converting. In each of these three steps sulfur dioxide is produced which cannot be discharged directly into the atmosphere and is therefore customarily used for the manufacture of sulfuric acid. But, as the manufacturing costs exceed those of other processes, the sulfuric acid so recovered can be sold only at an economic loss. Efforts have thus been made to recover the sulfur contained in the ore in the elemental form or to separate it as a water-insoluble compound. Several hydrometallurgical processes are available for this purpose.

From available literature on the subject, it is known that chalcopyrite is insoluble in the usual acids and is attacked only by ferric salt solutions. One method provides for the chalcopyrite concentrate to be ground to a particle size of less than 40 $\mu$m, which is then leached in boiling concentrated ferric chloride solution. After leaching two hours, most of the copper has been extracted from the mineral. However, the further processing of the copper chloride solution, having a very high iron content, is difficult and uneconomical.

Bacterial leaching has also been successfully employed for extracting copper, particularly from strip mine deposits, in which the minerals are admixed with large amounts of worthless rock or gangue. But the very slow rate of reaction and the high capital costs of the plant required, make this method unsuitable for treating concentrates.

According to another known leaching process utilizing ammonia under pressure, approximately 95 percent copper is released from a chalcopyrite concentrate when leached for nine hours in an ammoniacal solution at an elevated temperature and an air pressure of 8 kg/sq.cm. However, all of the sulfur in the chalcopyrite is converted to ammonium sulfate, rather than the desired elemental sulfur, which precludes the economic adoption of the process on a large scale.

A process based on acid pressure leaching must be employed to permit the recovery of the major part of the sulfur in elemental and thus saleable form. One prior art proposal provides for the flotation concentrate to be ground to a particle size of less than 40 $\mu$m and for the subsequent leaching operation to be carried out for three hours with a stoichiometric excess of concentrate to acid of 25 to 50 percent, within a temperature of 120°C. and an oxygen pressure of 35 kg/sq.cm. The surplus undissolved concentrate, subsequently separated from the sulfur recovered by a necessarily complicated procedure, must be returned to the grinding and leaching processes. Any increase in the rate of reaction by raising the temperature is limited by the low melting point of sulfur. If this is exceeded, pellets of tough sulfur and concentrate are formed, making the process difficult to perform and reducing the yield of copper. All of the proposals known to me for the hydrometallurgical extraction of copper from chalcopyrite concentrates have the disadvantage of requiring the use of unduly high temperature and pressure and a long period for leaching.

In addition to raising temperatures, a known means of accelerating the reaction is to increase the area of reaction. As a rule, conventional ball milling over a period of several hours yields a desirable particle size of less than 40 $\mu$m. By way of example, the following particle size distribution can be obtained when grinding a chalcopyrite concentrate: 45% with a particle size of less than 3 $\mu$m, 49% with a particle size of 3 to 10 $\mu$m and 6% with a particle size of 10 to 40 $\mu$m. However, comminution on this scale does not significantly improve leaching performance as a particle size of considerably less than 3 $\mu$m is desirable.

A type of ball mill, known as an attritor or attrition grinder, is capable of comminuting solids to much finer particle sizes. Machines of this kind are widely employed in the preparation of colored pigments and pharmaceuticals. Such machines have generally not found application in the processing of industrial metallic minerals, inasmuch as after such solids have been ground for a certain period, a state of equilibrium is attained between progressive comminution and particle agglomeration, as a result of which reduction ceases upon attainment of a specific particle size. As sulfide ores, particularly chalcopyrite, are highly hydrophobic, the resulting readiness with which agglomeration occurs does not permit appreciable reduction of particle size even by attrition grinding, and consequently no improvement in leaching performance is attained.

SUMMARY OF THE INVENTION

It is therefore an object of the present invention to eliminate the effect of agglomeration and its consequences when using attrition grinders, and to improve substantially the particle size reduction of chalcopyrite or bornite being ground. It is another object of the present invention to recover a substantial portion of the sulfur from chalcopyrite or bornite in the elemental state. Further advantages attainable by the invention include, improved leachability of chalcopyrite concentrates, reduction of the comminution period, overall process operation at lower temperature and pressure and within a shorter time than existing processes. As a result of these and other advantages, removal of copper from chalcopyrite and bornite concentrates can be effected utilizing inexpensive materials and simple pressure vessels without requiring special protective measures.

These and other objects of the present invention together with the advantages thereof over existing and prior art forms which will become apparent from the following specification, are accomplished by the means hereinafter described and claimed.

In general, a process for the extraction of copper from copper containing concentrates such as chalcopyrite or bornite includes the steps of comminuting the concentrate in the presence of a suitable liquid dispersing agent to reduce the period of time normally required to comminute the concentrate, and of leaching the comminuted concentrate in the presence of a silver catalyst so as to recover a large amount of elemental sulfur rather than sulfur dioxide.

DESCRIPTION OF THE PREFERRED EMBODIMENT -heptyl.

Comminution of the chalcopyrite or bornite concentrates to a particle size of substantially less than 3 $\mu$m, without attendant agglomeration, is achieved by the addition of liquid dispersing agents to the concentrate during grinding. Generally, anion-active dispersing agents such as lignin sulfonic acid sodium are employed in a quantity of from 0.3 to about 2.0 percent by weight of the concentrate.

Alkalies, such as ammonium hydroxide, potassium hydroxide and preferably sodium hydroxide, in a 3 to 30 percent solution by weight, have proved to be an even more suitable addition to the superfine grinding or comminution process. An addition of the alkaline hydroxide considerably accelerates the dissolution procedure during the subsequent leaching, although the reason for the advantageous effect of grinding in the presence of alkalies on the subsequent leaching of the concentrates is not clear. A comparison of settling rates in an attrition grinder of chalcopyrite charges, firstly with an addition of lignin sulfonic acid sodium and, secondly, with an addition of caustic soda, but under otherwise identical conditions of treatment, revealed that caustic soda does not increase the dispersion effect; however, the ground product with admixed caustic soda does settle out much more rapidly.

Following comminution of the concentrate, it is then subjected to oxidizing leaching with a leach solution such as sulfuric acid or with a partially de-coppered electrolyte from conventional electrolysis procedures. Leaching is preferably effected under an oxygen atmosphere and in the presence of a silver catalyst such as silver nitrate or silver sulfate in quantities of 0.1% by weight of the silver ion to the charge weight of the concentrate.

With an addition of approximately 1 percent by weight of lignin sulfonic acid sodium to the grinding fluid, the milling operation had to be carried out for 30 minutes and followed by leaching for 220 minutes at a temperature of 110°C. and with oxygen at a pressure of 1 kg/sq.cm. to effect 100 percent dissolution. Using a 10% solution of sodium hydroxide as the grinding fluid the same result was obtained after milling for 15 minutes and leaching for 30 minutes, under otherwise equal conditions.

Details of the individual steps in which the process can be performed are as follows:

Flotation material, which generally has a particle size of less than 150 $\mu$m, is wet ground, preferably with the addition of a dilute solution of sodium hydroxide of from 3 to about 10 percent by weight, in a standard type ball mill. The ball mill should be operated in a closed circuit with a classifier or hydro-bowl, which returns oversize material, e.g., larger than 40 $\mu$m, to the ball mill. The fines entrained in the grinding fluid are fed to a thickener, whose overflow is in turn connected with the ball mill. A quantity of the 3 to 10 percent solution of sodium hydroxide is stirred into the thickened product, to give a pulp containing from 30 to about 60 percent by weight of the concentrate. This pulp is fed to the attrition grinder. Batch tests have revealed that after a grinding period of only five minutes, approximately 100 percent dissolution is achieved in the subsequent leaching operation. In practice the continuous grinding method will be employed and to be on the safe side, a longer grinding time should be allowed, preferably about 15 minutes.

The discharge from the attrition grinder is again fed to a thickener, whose overflow is used for mixing with the pulp from the preliminary grinding of the concentrate. The thickened sludge is now agitated with partly de-coppered electrolyte, or if the method of solvent extraction is employed, with leach solution such as sulfuric acid containing no copper, so that for a liter of fluid there are approximately 150 to 200 grams of solids, depending on the copper content of the concentrate. Although the solids content can fluctuate within broad limits, it is advisable that it not exceed the saturation point of the leach solution at room temperature so as to insure that when the plant is shut down, and the solutions cool, no copper sulfate crystallizes out as this would block the piping and valves. In the subsequent dissolving operation both iron and copper are converted to sulfates. The removal of the iron as jarosite, bonds a mole of sulfate to a mole of iron. Approximately 80 percent of the sulfur in the concentrate is precipitated as elemental sulfur and 20 percent is converted to sulfuric acid by oxidation. However, a 50 percent conversion of the sulfur into sulfuric acid is desirable inasmuch as the acid is recycled to the leaching tank. This deficiency of sulfuric acid has to be made good by an addition of acid, preferably prior to entry into the leaching tank. To improve the leaching operation, 0.1 percent silver by weight of the concentrate should also be added to the concentrate, the silver taking the form of a silver salt, such as silver nitrate or silver sulfate.

The leaching temperature should be as high as possible but lower than the melting point of sulfur (monoclinic 119°C., rhombic 112°C.), otherwise the yield will be reduced through the inclusion of ore particles in the molten sulfur. Consequently, the temperature is preferably limited to approximately 110°C. The requisite pressure of the oxygen is approximately 1 kg/sq. cm., and the water vapor pressure at said temperature is about 1.4 kg/sq.cm., so that the total pressure of the system is in the region of about 2.5 kg/sq.cm. Lower temperatures and oxygen pressures can be employed at the cost of longer leaching time. Even at 90°C., by doubling the leaching period, recoveries in excess of 90 percent can be achieved.

It is advisable to fix the leaching period at 30 minutes. In batch operation more than 90 percent of the copper would be brought into solution after 15 minutes; however, when superfine grinding is desired and the attrition mill is employed, the continuous method will generally be preferred. As described above, the overflow from the attrition grinder is mixed with the pulp from the ball mill and to be on the safe side, the mean retention time within the leaching tank should be approximately 30 minutes.

It is preferable to use a heavy-duty agitator for loading the leachant with oxygen gas, to afford a maximum contact area between the gas and fluid, as kinetic tests have revealed that the slowest part of the leaching operation is the passing of the oxygen gas into the solution.

The process steps after leaching are performed by a sequence of methods known in the art. The suspended particles of gangue, elemental sulfur and undissolved residues of the concentrate in the slightly acid copper sulfate solution are separated in a thickener. The solution which contains iron as well as copper is, with the aid of sodium hydroxide, adjusted to a pH value of approximately 2. Sodium sulfate is added and the iron is precipitated as jarosite. As sodium ions are required for the precipitation of iron, the product need not be washed after wet grinding in the ball mill or after superfine grinding in the attrition mill. The purified solution is then fed to an electrolytic refining unit, where the copper is deposited on the cathodes and the spent electrolyte is recycled for agitating the pressure vessel solution.

As the electrolyte is enriched with base impurities, it must be subjected to continuous partial or intermittent purification by means of solvent extraction. The requisite measures for this operation will depend on the accompanying elements of the concentrate.

The sulfur in the leach residue from the thickener is removed by melting and filtration or by extraction with chlorinated hydrocarbon or carbon disulfide. The residue from this operation contains the precious metals included in the copper ore and the silver added prior to leaching. These precious metals are recovered in a known manner, of which cyanide leaching is typical. The silver is converted to silver nitrate and recycled as catalyst to the superfinely ground concentrate prior to leaching.

What is claimed is:

1. A process for the extraction of copper from copper containing minerals such as chalcopyrite and bornite comprising the steps of: comminuting the concentrate, having a particle size of at least 40 $\mu$m, in a conventional attrition grinder and in the presence of a liquid dispersing agent, selected from the class consisting of ammonium hydroxide, potassium hydroxide and sodium hydroxide for a period of time ranging from about 5 to 15 minutes so as to form a pulp having particles the size of which range from 3 $\mu$m to substantially less than 3 $\mu$m, and leaching said pulp in the presence of a silver catalyst and oxygen gas at a pressure of approximately 1 kg/sq.cm. at a temperature of approximately 110°C. and for a period of time of from about 15 minutes to about 30 minutes wherein more than 90 per cent of the copper is brought into solution.

2. A process for the extraction of copper, as in claim 1, wherein said sodium hydroxide has a strength of from 3 to about 30 percent by weight.

3. A process for the extraction of copper as in claim 1, wherein said leaching is effected with a leaching agent selected from the group consisting of: sulfuric acid and copper sulfate solution.

4. A process for the extraction of copper, as in claim 1, wherein said silver catalyst is selected from the group consisting of silver nitrate and silver sulfate.

5. A process for the extraction of copper, as in claim 4, wherein said silver catalyst is employed in quantities of approximately 0.1 percent by weight of silver with respect to the weight of the concentrate.

* * * * *